United States Patent [19]
McKiel, Jr.

[11] Patent Number: 6,046,722
[45] Date of Patent: Apr. 4, 2000

[54] METHOD AND SYSTEM FOR ENABLING BLIND OR VISUALLY IMPAIRED COMPUTER USERS TO GRAPHICALLY SELECT DISPLAYED ELEMENTS

[75] Inventor: Frank Albert McKiel, Jr., Trophy Club, Tex.

[73] Assignee: International Business Machines Corporation, Armonk, N.Y.

[21] Appl. No.: 07/802,956

[22] Filed: Dec. 5, 1991

[51] Int. Cl.$^7$ .................................................. G09G 5/08
[52] U.S. Cl. ........................................... 345/145; 345/157
[58] Field of Search .................................. 340/709, 710, 340/825.19; 434/112, 116, 114; 395/155, 159; 341/20, 21, 27; 345/145, 146, 156, 157, 163, 172; 364/188; 348/62

[56] References Cited

U.S. PATENT DOCUMENTS

| | | | |
|---|---|---|---|
| 3,800,082 | 3/1974 | Fish ............................................ | 348/62 |
| 4,014,016 | 3/1977 | Sherritt et al. ............................. | 341/21 |
| 4,322,744 | 3/1982 | Stanton ..................................... | 434/116 |
| 4,594,683 | 6/1986 | Frank ........................................ | 341/21 |
| 4,694,725 | 9/1987 | Seevers et al. ............................ | 341/27 |
| 4,698,625 | 10/1987 | McCaskill et al. ....................... | 340/709 |
| 4,843,568 | 6/1989 | Krueger et al. ............................ | 358/93 |
| 4,847,605 | 7/1989 | Callahan et al. .......................... | 340/709 |
| 4,875,185 | 10/1989 | Bornschein ........................ | 340/825.19 |
| 4,979,094 | 12/1990 | Gemmell et al. ........................ | 364/188 |
| 4,985,692 | 1/1991 | Breider et al. ........................... | 434/112 |
| 5,016,003 | 5/1991 | Rice, Jr. et al. ......................... | 345/172 |
| 5,169,342 | 12/1992 | Steele et al. ............................. | 434/112 |
| 5,186,629 | 2/1993 | Rohen ....................................... | 340/710 |
| 5,223,828 | 6/1993 | McKiel, Jr. .............................. | 345/168 |

OTHER PUBLICATIONS

Barnett et al., IBM Tech Discl., V26, No. 10A, Mar. 1984, pp. 4950–4951.

Comerford, IBM Tech Discl., vol. 28, No. 3 Aug. 1985, pp. 1343–1344.

Lazzaro, "Windows of Vulnerability", Byte, 1991, Jun.; p. 416.

Drumm et al., IBM Tech. Disclosure, vol. 27, No. 4B Sep. 1984, p. 2528.

Affinito et al, IBM Tech Disclosure, vol. 31, No. 12, May 1989, p. 386.

Golding et al., IBM Tech Disclosure, vol. 26, No. 10B, Mar. 1984, pp. 5633–5636.

Edwards, IEE, Int. Conf. on Speech Input/Output; pp. 154–157 24–26, Mar. 1986.

Edwards, Int, J. Man–Machine Studies, Modelling Blind User's Interactions with an Auditory Computer Interface; pp. 575–589, May 1989.

Computerworld, "Macs Talk to Visually Impaired," p. 17, Jun. 4, 1990.

*Primary Examiner*—Steven J. Saras
*Attorney, Agent, or Firm*—Edward H. Duffield; Andrew J. Dillon

[57] ABSTRACT

The method and system of the present invention may be utilized to enable a blind or visually impaired computer user to graphically select a displayed graphic element within a computer system display. A unique identifiable audible signal is associated with each displayed graphic element. A movable cursor element or pointer is displayed within the computer system display and a composite audible signal is periodically generated in response to the position of the movable cursor element. The composite audible signal preferably includes elements of each identifiable audible signal associated with each displayed graphic element within a predetermined radius of the location of the movable cursor element. In one embodiment of the present invention, each displayed graphic element comprises multiple picture elements and the composite audible signal includes elements of each identifiable audible signal associated with each displayed graphic element having picture elements within a rotatable sector of a circle having its origin at the movable cursor element and a radius equal to the predetermined radius.

6 Claims, 5 Drawing Sheets

METHOD AND SYSTEM FOR ENABLING BLIND OR VISUALLY IMPAIRED COMPUTER USERS TO GRAPHICALLY SELECT DISPLAYED ELEMENTS

CROSS-REFERENCE TO RELATED APPLICATION

The present application is related to U.S. patent application Ser. No. 07/746,838, filed Aug. 19, 1991, entitled "Method and System for Enabling a Blind Computer User to Handle Message Boxes in a Graphical User Interface," and U.S. patent application Ser. No. 07/746,840, filed Aug. 19, 1991, entitled "Audio User Interface with Stereo and Filtered Sound Effects" both by the inventor hereof, assigned to the assignee herein, and incorporated herein by reference thereto.

BACKGROUND OF THE INVENTION

1. Technical Field

The present invention relates in general to methods and system for enhancing the usability of computer systems by blind or visually impaired users, and more particularly to methods and systems for permitting blind or visually impaired users to use a graphical user interface. Still more particularly, the present invention relates to methods and systems for enabling a blind or visually impaired user to graphically select displayed elements in a graphical user interface.

2. Description of the Related Art

In recent years, there has been a move among computer application software developers toward graphical user interfaces. In a graphical user interface, objects are presented for users to manipulate in ways which are similar to the manner in which such objects are manipulated in the work place. Objects, such as file cabinets, folders, documents, and printers, are displayed on the computer screen as miniature graphic representations, or icons. Users then manipulate these objects with a mouse or other graphical pointing device to perform desired operations.

For example, in order to file a document in a folder which is located within a file cabinet in the work place, a user will open the file cabinet, locate and open the correct folder, and then place the document inside. In the electronic work place of the graphical user interface, the user performs a similar process. Thus, a user will open the file cabinet icon, locate the correct folder icon, and then drop the document icon in the located folder. Because this is an electronic environment, users do not have to open the folder to put the document into it. However, users are thus able to utilize their knowledge of a real work place in order to perform this operation.

Normally sighted individuals find graphical user interfaces intuitive and easy to work with. However, except for an occasional "beep" or similar tone, graphical user interfaces are virtually silent and the vast majority of the information which such interfaces provide to the user is visual. Thus, graphical user interfaces are essentially not usable by blind or severely visually impaired people.

Blind and visually impaired computer users currently benefit from many forms of adaptive technology, including speech synthesis, large-print processing, braille desk top publishing, and voice recognition. However, presently almost none of the foregoing tools have been adapted for use with a graphical user interface. It has been suggested that programmers could write software with built-in voice labels for icons. Lazzaro, Windows of Vulnerability, Byte Magazine, June 1991, page 416.

Various synthetic or recorded speech solutions for making computer display contents available to blind persons have also been suggested, for example in Golding et al., IBM Technical Disclosure Bulletin, Vol. 26, No. 10B, pages 5633–5636 (March 1984); and, Barnett et al., IBM Technical Disclosure Bulletin, Vol. 26, No. 10A, pages 4950–4951 (March 1984).

Additionally, there have been suggested systems which include a mouse with a braille transducer so that a blind mouse user may read text and obtain certain tactile position feedback from such a mouse. Comerford, IBM Technical Disclosure Bulletin No. 3, Vol. 28, page 1343 (August 1985); and Affinito, et al., IBM Technical Disclosure Bulletin No. 12, Vol. 31, page 386 (May 1989). However, while announcing various text items, either audibly or by means of a braille transducer in the mouse, such systems may provide some information to a blind user, they do not enable the user to navigate about and locate objects on the computer display screen.

There have been suggested an audible cursor positioning and pixel (picture element) status identification mechanism which may be utilized to help a user of an interactive computer graphics system locate data by utilizing aural feedback to enhance visual feedback. As the cursor in such a system is stepped across the screen, an audible click is generated which varies in tone corresponding in tone to the current status of each pixel encountered. With this combination in audible and visual cursor feedback, it becomes a simple task to identify the desired line by noting the change in tone as the cursor moves. For color display applications, each color is represented by a distinct tone so that any single pixel may be distinguished from surrounding pixels of a different color. It has been suggested that this system is especially helpful for visually impaired or learning disabled users. Drumm et al., IBM Technical Disclosure Bulletin No. 48, Vol. 27, page 25–28 (September 1984). However, the foregoing disclosure does not suggest a means of enabling a blind user to navigate about or locate objects on a computer display screen.

Recently, in one of the cross-referenced applications cited herein, a system has been proposed which permits a blind or visually impaired user to interact with a so-called "message box" within a graphical user interface. As those skilled in the art will appreciate, each message box consists of an icon, explanatory text, and one or more "push buttons." The icon allows the user to identify visually the type of message. The text typically explains the situation and may provide assistance. The textual content may be a question or a statement. Push buttons provided within a message box typically allow the user to interact with the message box.

The proposed system permits blind or visually impaired users to accommodate a message box by announcing the textual contents of such a box when the message box first appears. Thereafter, the push buttons available to respond to the message box are also announced in order from left to right. A homing signal is then provided for finding the message box which increases in pitch as the mouse pointer approaches the message box. When the pointer enters the message box, the message box text and available push buttons are reannounced and the pointer is automatically moved to a default push button. By utilizing this system, a blind or visually impaired user may locate a message box within a computer display system; however, this system fails to provide any suggestion of a manner in which a blind or visually impaired user may selectively locate multiple displayed elements within a graphical user interface.

Another method and system have also been recently proposed in the second cross-referenced application cited herein, which permits a blind or visually impaired user to locate a mouse pointer or other graphical pointing device within the client area of a window within a graphical user interface by providing a stereo sound system and varying the intensity of the left and right audio channels to indicate a position of the mouse pointer. This system also proposes an increase in pitch of an associated sound to indicate the position of the pointer in the top or bottom of the client area of a window. While this system permits a blind or visually impaired user to manipulate a mouse pointer within a graphical user interface, it fails to show or suggest any technique whereby a particular one of a group of displayed graphical elements may be selected by such a user.

Thus, it should be apparent that a need exists for a method and system whereby a blind or visually impaired user may graphically select displayed elements within a graphical user interface.

SUMMARY OF THE INVENTION

It is therefore one object of the present invention to provide a method and system for enhancing the usability of computer systems by blind or visually impaired users.

It is another object of the present invention to provide an improved method and system for permitting blind or visually impaired users to utilize a graphical user interface within a computer system.

It is yet another object of the present invention to provide an improved method and system which enables a blind or visually impaired user to graphically select displayed objects within a graphical user interface.

The foregoing objects are achieved as is now described. The method and system of the present invention may be utilized to enable a blind or visually impaired computer user to graphically select a displayed graphic element within a computer system display. A unique identifiable audible signal is associated with each displayed graphic element. A movable cursor element or pointer is displayed within the computer system display and a composite audible signal is periodically generated in response to the position of the movable cursor element. The composite audible signal preferably includes elements of each identifiable audible signal associated with each displayed graphic element within a predetermined radius of the location of the movable cursor element. In one embodiment of the present invention, each displayed graphic element comprises multiple picture elements and the composite audible signal includes elements of each identifiable audible signal associated with each displayed graphic element having picture elements within a rotatable sector of a circle having its origin at the movable cursor element and a radius equal to the predetermined radius.

BRIEF DESCRIPTION OF THE DRAWING

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
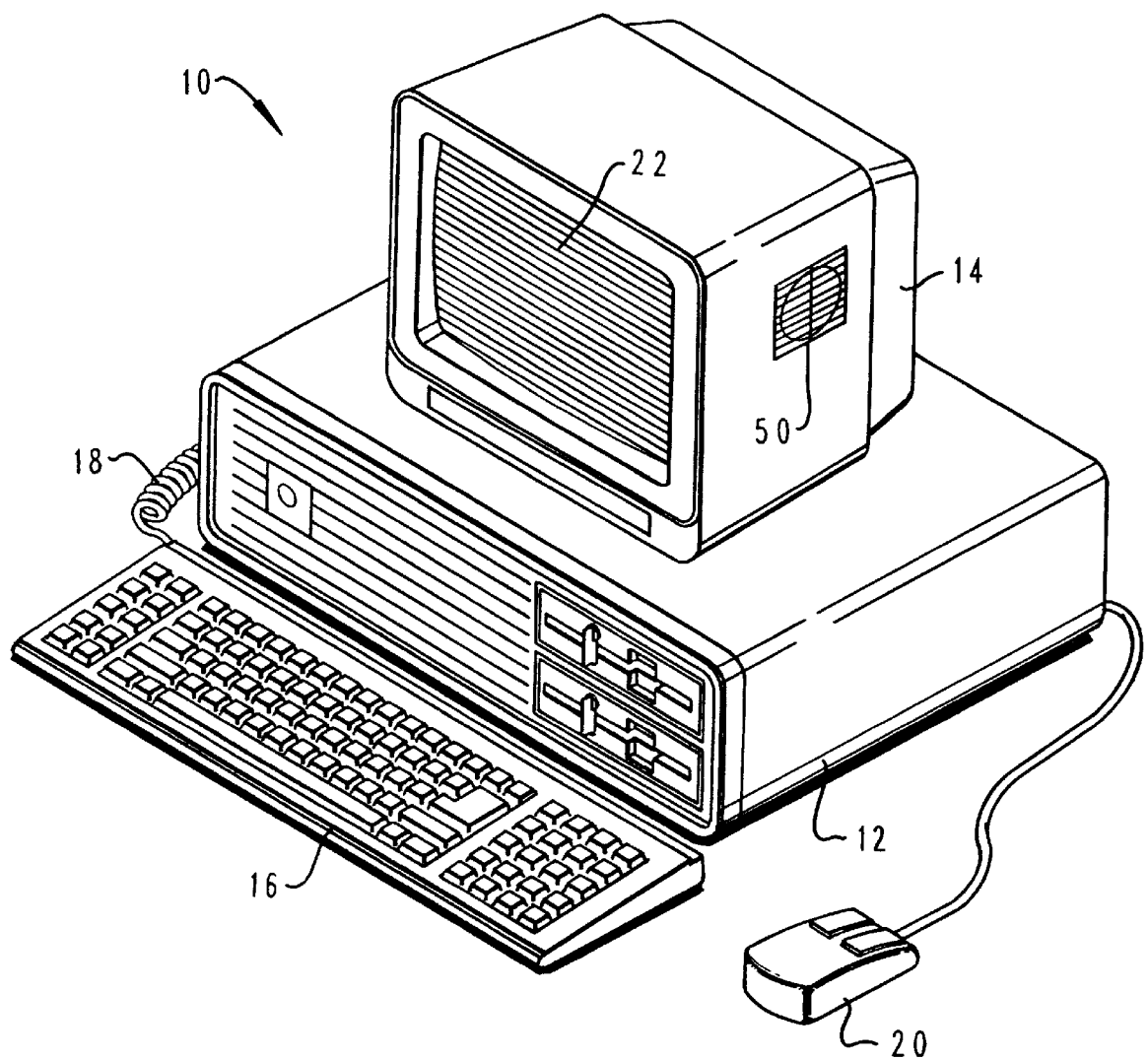
FIG. 1 is a pictorial representation of a data processing system which may be utilized to implement the method and system of the present invention.

With reference now to the figures and in particular with reference to FIG. 1, there is depicted a pictorial representation of a data processing system 10 which may be utilized to implement the method and system of the present invention. As is illustrated, data processing system 10 preferably includes a processor module 12 and a video display 14. Coupled to processor module 12 by means of cable 18 is keyboard 16, in a manner well known in the art. Also coupled to processor module 12 is mouse 20.

As depicted, video display 14 includes a display screen 22 and a speaker 50, which may be utilized to generate various tones which may be utilized by a blind or visually impaired person to locate objects displayed within display screen 22 in a manner which will be explained in greater detail herein. Those skilled in the art will appreciate that data processing system 10 may be implemented utilizing any so-called "personal computer" such as the PS/2 Computer manufactured and distributed by International Business Machines Corporation.

Figure 2:
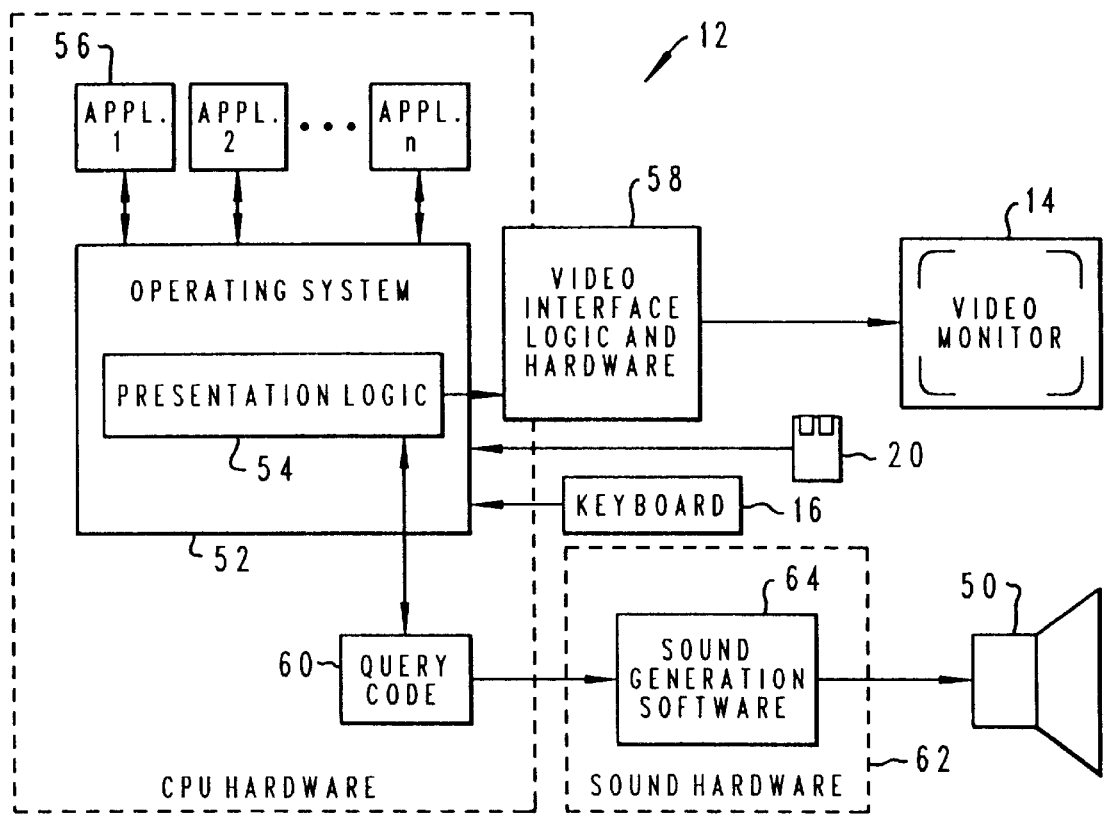
FIG. 2 is a high level block diagram of the data processing system of FIG. 1.

Referring now to FIG. 2, there is depicted a high level block diagram of data processing system 10 of FIG. 1. As is illustrated, the central processing unit hardware within processor module 12 is depicted within the dashed rectangle, which is also numbered 12. Operating within the central processing unit hardware is an operating system 52 which preferably includes presentation logic 54. A plurality of applications 56 are depicted running on operating system 52. Video interface logic and hardware 58 receive information from presentation logic 54, which is, in a manner well known to those skilled in the art, displayed within video display 14. Mouse 20 and keyboard 16 are also depicted within FIG. 2, coupled to operating system 52 in a manner well known in the personal computer art.

Data processing system 10 preferably includes query code 60 which receives information from presentation logic 54 which includes the type of window displayed within video display 14, including the position and size of the window, and the current pointer position associated with mouse 20. Query code 60 preferably provides information to sound generation software 64 within sound hardware 62 in order to provide a composite audible signal which includes elements which may be utilized by a blind or visually impaired user to locate selected graphic elements within video display 14. The composite audible signal thus generated is coupled to speaker 50 and utilized in the manner which will be explained in greater detail herein.

Figure 3:
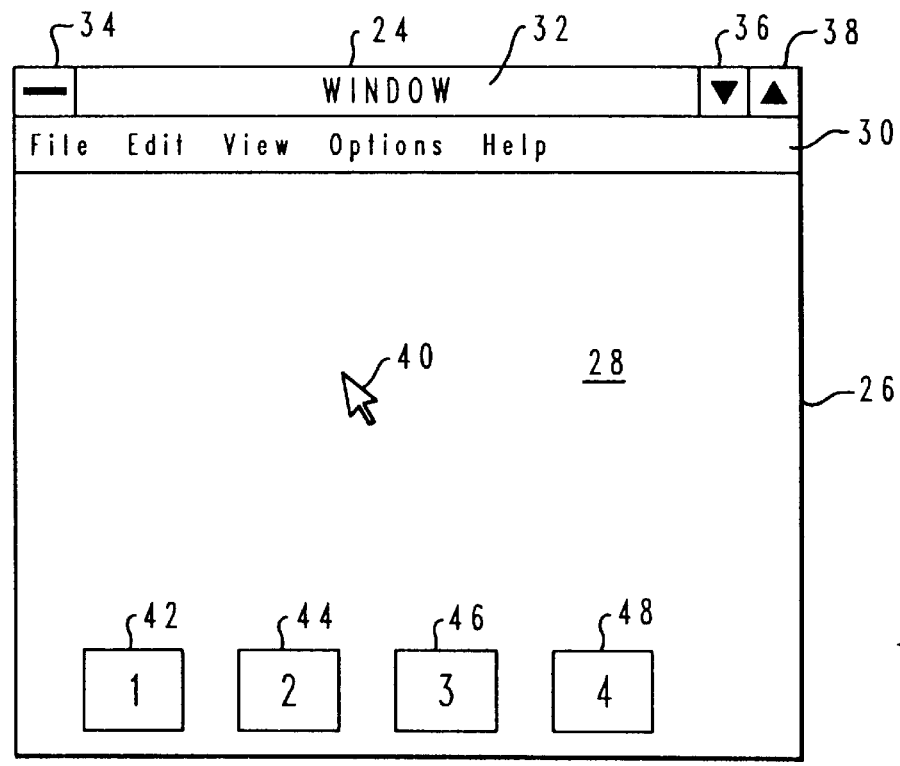
FIG. 3 is a pictorial representation of a display presentation which may be utilized to illustrate the method and system of the present invention.

With reference now to FIG. 3, there is depicted a pictorial representation of a display presentation which may be utilized to illustrate the method and system of the present invention. As illustrated in FIG. 3, a window 24 is depicted. Those skilled in the art will appreciate that windows or viewports are commonly utilized in a so-called "graphical user interface" and that such windows typically include graphical depictions of various applications or objects as miniature graphic representations or "icons." Window 24 is preferably displayed within display screen 22 of data processing system 10, in a manner well known to those skilled in this art.

As is typical in such applications, window 24 preferably includes a border 26, a title bar 32, a menu bar 30 and a client area 28. Title bar 32 preferably includes, in addition to a textual indication of the title of window 24, system menu icon 34, and window sizing icons 36 and 38.

Those skilled in the art of window type presentations will appreciate that system menu icon 34 permits a user to display a pull-down menu containing those actions which a user may perform on window 24. Window-sizing icons 36 and 38 preferably provide a rapid and efficient manner whereby a user may utilize a mouse pointer or other graphical pointing device to minimize window 24 by reducing it to an icon, or by maximizing window 24 to display the largest possible depiction of window 24 which is possible within display screen 22.

Menu bar 30 preferably contains a list of actions which are associated with an application depicted within window 24. A user may cause the system to display a pull-down menu under each item within menu bar 30 in a manner which is well known in this art.

Client area 28 comprises the remainder of window 24. Client area 28 is the focus of the user's attention and it is within client area 28 that the user is presented with various objects upon which the user wishes to work. As those skilled in the art and familiar with such presentations will recognize, the window client area is normally populated with text and/or icons. In the illustration provided within FIG. 3, window client area 28 preferably includes four icons 42, 44, 46, and 48. Additionally, a mouse pointer 40 is depicted within window client area 28. Mouse pointer 40 may be utilized, in a manner well known in the art, to permit a user to select one of the displayed icons within window client area 28.

As discussed above, systems have been proposed which permit audible feedback to be generated in response to the position of mouse pointer 40 by associating different audible characteristics with various objects within window client area 28. While such a system represents an improved method whereby blind or visually impaired users may receive an audible indication of the presence of an object within window client area 28 beneath mouse pointer 40, the relative area occupied within window client area 28 by various icons and objects is quite small and thus, under normal circumstances, very little audible feedback may be generated. It is therefore clear that a need exists for a method and system whereby a blind or visually impaired user may receive audible feedback regarding objects or applications which are present within a predetermined radius of mouse pointer 40, thereby increasing the effectiveness of such audible feedback.

Figure 4:
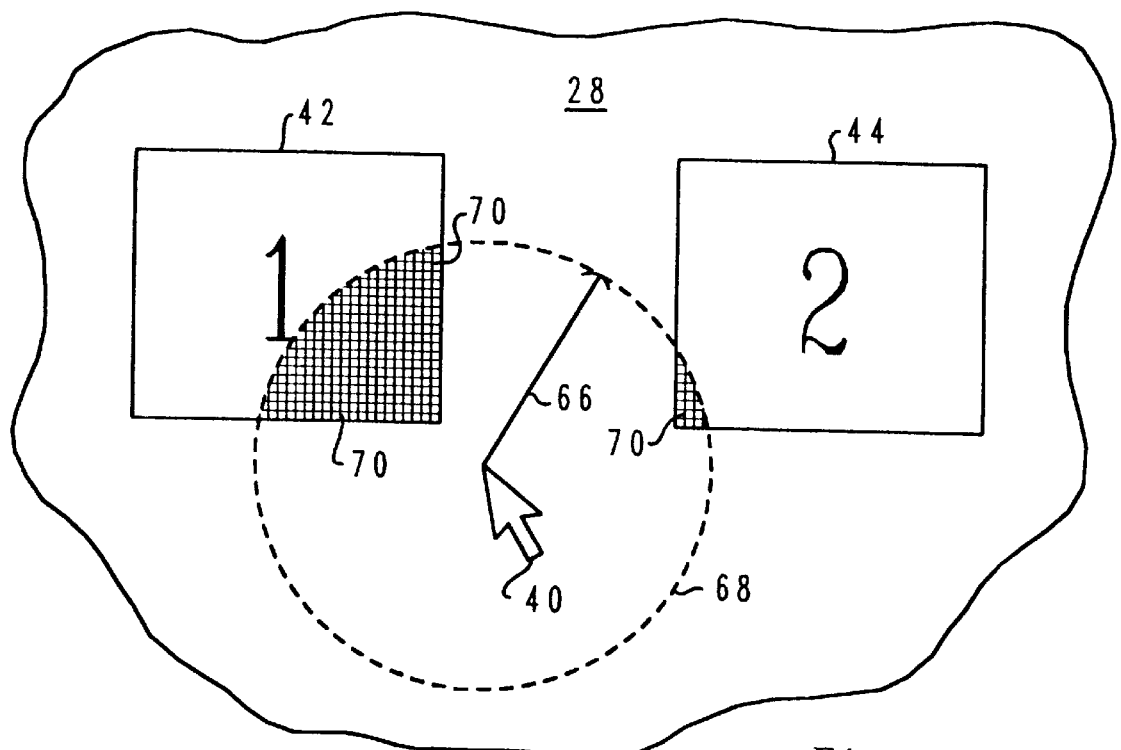
FIG. 4 is an enlarged pictorial representation of a portion of the display presentation of FIG. 3 illustrating one embodiment of the method and system of the present invention.

Referring now to FIG. 4, there is depicted an enlarged pictorial representation of a portion of the display presentation of FIG. 3. As illustrated, mouse pointer 40 is positioned at a location within window client area 28 which is adjacent to but not overlying either icon 42 or 44. In accordance with a preferred embodiment of the present invention, an area of interest 68 is specified as including all picture elements which exist within a radius 66 of the vertex of mouse pointer 40. As is illustrated, icon 42 is located much closer to the vertex of mouse pointer 40 than icon 44 and as a result an audible feedback signal will be generated in accordance with the present invention which indicates this fact to a blind or visually impaired user. In accordance with a depicted embodiment of the present invention, each icon 42, 44, 46 and 48 within window client area 28 (see FIG. 3) has associated therewith a distinct audible tone. For example, icon 42 may have associated therewith an identifiable audible signal having a center frequency of 500 Hertz. Similarly, icon 44 may have associated therewith an identifiable audible signal having a center frequency of 1,000 Hertz. In a like manner, icon 46 may have associated therewith an identifiable audible tone having a frequency of 1,500 Hertz and icon 48 may have an audible tone associated therewith at a frequency of 2,000 Hertz.

After associating an identifiable audible tone with each icon within window client area 28 and predetermining a radius 66 for an area of interest 68, it may be seen that picture elements 70 of icon 42 are present within area of interest 68 and are located closer to the vertex of mouse pointer 40 than the picture elements 70 of icon 44. Thus, in accordance with this embodiment of the present invention, a composite audible signal will be generated having both a 500 Hertz component and a 1,000 Hertz component. The 500 Hertz component will be substantially greater in volume than the 1,000 Hertz component indicating to a blind or visually impaired user that the vertex of mouse pointer 40 is substantially closer to icon 42 than icon 44. This, as those skilled in the art will appreciate, may be accomplished by varying the amplitude of an associated identifiable audible tone inversely in proportion to the distance between the vertex of mouse pointer 40 and a single picture element within icon 42 and/or icon 44.

Figure 5:
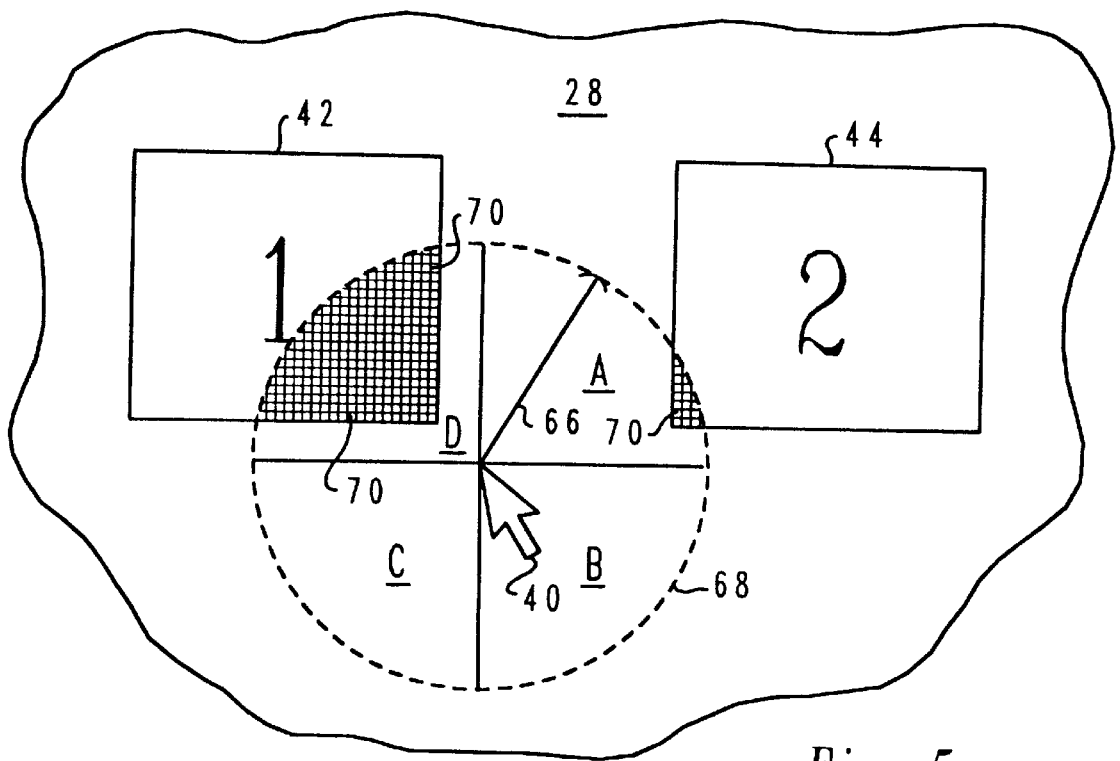
FIG. 5 is an enlarged pictorial representation of a portion of the display presentation of FIG. 3 illustrating a second embodiment of the method and system of the present invention.

With reference now to FIG. 5, there is depicted an enlarged pictorial representation of a portion of display presentation of FIG. 3, which illustrates a second embodiment of the method and system of the present invention. As within FIG. 4, the vertex of mouse pointer 40 is located within window client area 28 overlying neither icon 42 or 44. As above, a much larger number of picture elements 70 within icon 42 are present within area of interest 68 than the number of picture elements 70 within icon 42. In this embodiment of the present invention area of interest 68 is divided into a number of sectors, such as quadrants. Thus, area of interest 68 has been divided into quadrant A, quadrant B, quadrant C, and quadrant D. Thereafter, in a manner which will be explained in greater detail herein, each quadrant within area of interest 68 may be investigated cyclicly and sequentially in order to generate a composite audible signal having elements therein which are associated with selected objects, such as icon 42 and icon 44.

Thus, an examination of quadrant A within area of interest 68 will result in the generation of a identifiable audible tone associated with icon 42 at an amplitude which is proportional to the number of picture elements 70 within icon 44 which are present within quadrant A. Next, quadrant B will be investigated and, as illustrated within FIG. 5, no identifiable audible signal will be generated, as no graphic objects are located within quadrant B of area of interest 68. Thereafter, quadrant C will be investigated and a similar situation will occur.

Finally, quadrant D is investigated and a large number of picture elements 70 associated with icon 42 are present. Thus, an identifiable audible tone associated with icon 42 will be generated at a substantially higher volume than the tone which was generated with regard to quadrant A. In this manner, utilizing a technique which is similar to the "sweep" of a radar, a blind or visually impaired user may, by the cyclic generation of identifiable audible signals, determine the relative location of various objects within window client area 28 with respect to the vertex of mouse pointer 40.

Of course, if two objects are located within a single quadrant of area of interest 68, a composite signal may be generated including elements of both identifiable audible signals. Additionally, an orientation of the various sectors or quadrants within area of interest 68 may be easily obtained by generating a distinct sound at a predetermined location within the cyclic evaluation of area of interest 68. For example, a "click" or "beep" may be generated at the uppermost portion of area of interest 68, after evaluating quadrant D and before beginning to evaluate quadrant A. In this manner, a blind or visually impaired user listening to the composite audible signal which has been generated may discern the relative positions of objects within window client area 28 with respect to the vertex of mouse pointer 40.

Figure 6:
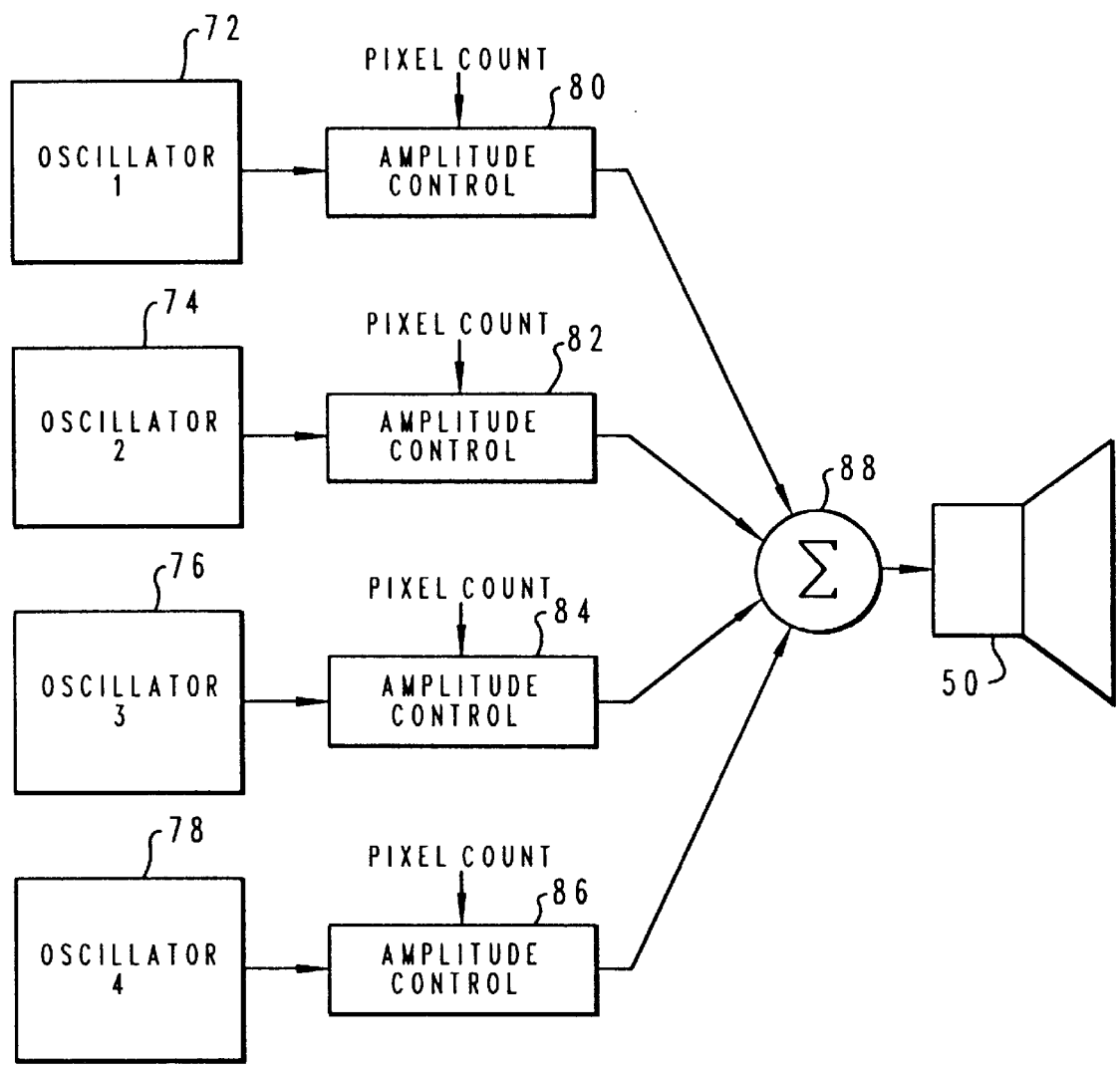
FIG. 6 is a high level block diagram of a sound generation system which may be utilized to implement the method and system of the present invention.

Referring now to FIG. 6, there is depicted a high level block diagram of a sound generation system which may be utilized to implement the method and system of the present invention. As illustrated, the system includes four oscillators, oscillator 72, oscillator 74, oscillator 76, and oscillator 78. Each oscillator may be utilized to generate an identifiable audible signal associated with a particular object within window client area 28. For example, oscillator 72 may generate a tone associated with icon 42 while oscillator 74 generates an identifiable audible signal associated with icon 44. Of course, those skilled in the art will appreciate that multiple oscillators may be implemented utilizing a single oscillator and a series of multipliers and/or filtration techniques, and that a greater or lesser number of oscillators and objects may be utilized.

As illustrated within FIG. 6, the output of each oscillator is coupled an amplitude control circuit 80, 82, 84, and 86 respectively. Amplitude control circuits 80, 82, 84, and 86 are utilized to vary the amplitude of an identifiable audible signal generated by an associated oscillator in accordance with the distance between the vertex of mouse pointer 40 and an object within area of interest 68 or, as illustrated within FIG. 6, in accordance with the number of picture elements or "pixels" of each associated object which exists within area of interest 68 or a sector thereof Thus, those skilled in the art will appreciate that by simply counting the picture elements present within area of interest 68 or a sector thereof, the amplitude of an identifiable audible signal associated with a particular object within window client area 28 may be simply and efficiently varied.

Thereafter, the outputs of each amplitude control circuit are coupled to summation circuit 88, which is utilized to generate a composite audible signal which includes elements of each identifiable signal associated with each graphic element within the area of interest surrounding the vertex of mouse pointer 40. This composite audible signal is then coupled to speaker 50 and utilized, as explained above, to permit a blind or visually impaired user to locate selected objects which are present within a computer display.

Figure 7:
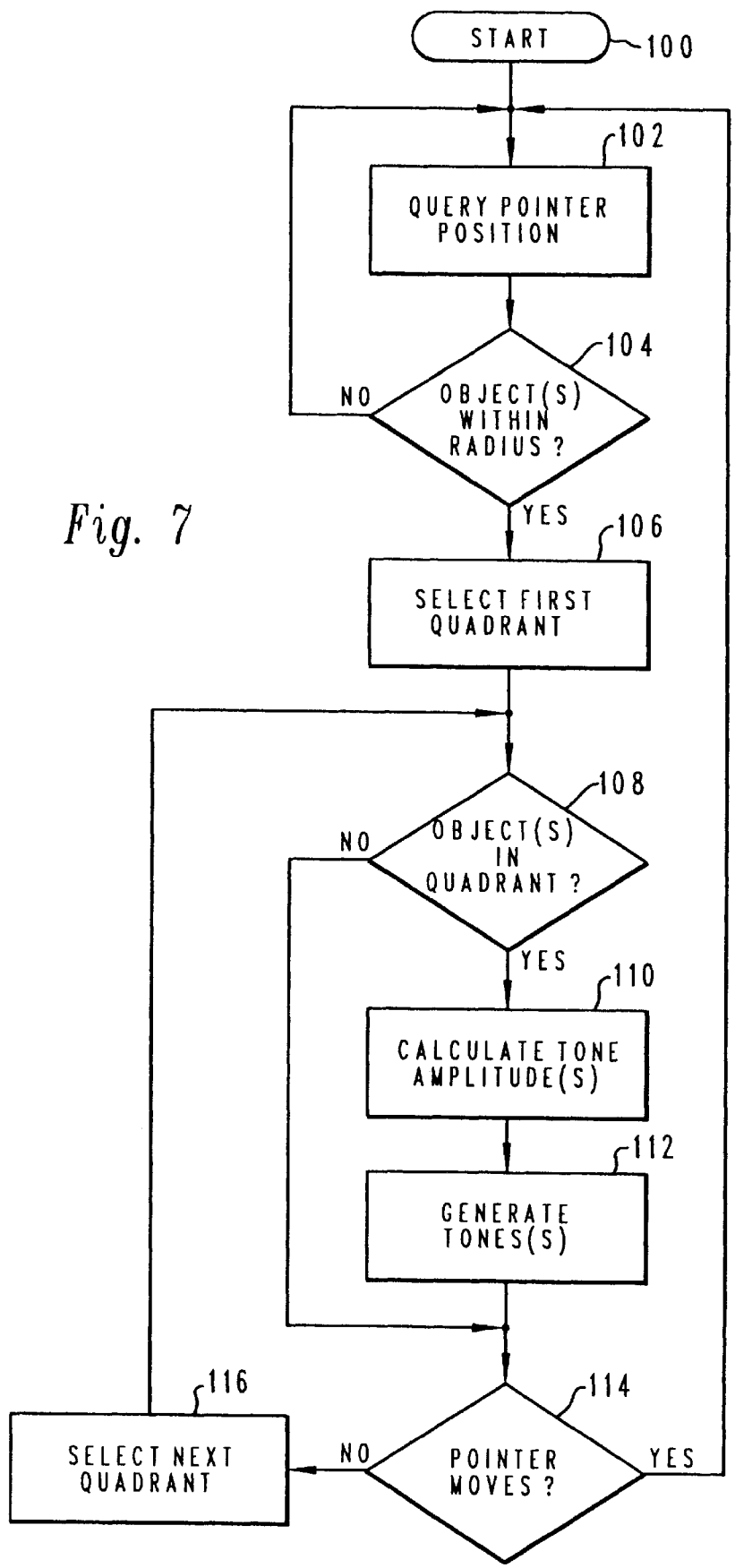
FIG. 7 is a high level logic flowchart illustrating a preferred software implementation of the method and system of the present invention.

Finally, with reference to FIG. 7, there is depicted a high level logic flowchart which illustrates a preferred software implementation of the present invention. As illustrated, the process begins at block 100 and thereafter passes to block 102. Block 102 depicts a querying of the pointer position within window client area 28. Next, the process passes to block 104 which illustrates a determination of whether or not an object or objects are present within radius 66 (see FIGS. 4 and 5) of the pointer position. If not, the process returns to block 102 in an iterative fashion until such time as mouse pointer 40 (see FIG. 3) is moved to within a predetermined distance from an object within window client area 28.

In the event one or more objects are present within the area of interest, as determined at block 104, the process passes to block 106. Block 106 illustrates the selection of a first quadrant within the area of interest. Of course, a greater or lesser number of sectors within the area of interest may be selected as a matter of design choice. The process then passes to block 108 which depicts a determination of whether or not one or more objects are present within the quadrant under examination.

In the event one or more objects are depicted within the quadrant under examination, as determined at block 108, the process passes to block 110. Block 110 illustrates the calculation of the tone amplitudes which are associated with the objects which are present within the quadrant under examination and thereafter, the process passes to block 112, which illustrates the generation of these tones in a composite audible signal in the manner described above.

Thereafter, after a selected period of time has elapsed the process passes to block 114. Block 114 illustrates a determination of whether or not the pointer has relocated and if so, the process returns to block 102 to determine the new pointer position and the process repeats in an iterative fashion. However, in the event the pointer has not relocated, as depicted at block 114, the process passes to block 116. Block 116 illustrates the selection of the next quadrant and the process then returns iteratively to block 108. Block 108 then illustrates a determination of whether or not one or more objects are present within the current quadrant under examination and the process proceeds in an iterative fashion.

Upon reference to the foregoing those skilled in the art will appreciate that the Applicant herein has provided a technique whereby graphic elements within a computer display may be located by a blind or visually impaired user by associating a selected radius defining an area of interest surrounding the vertex of a mouse pointer or other graphical pointing device and thereafter generating composite audible signals which include identifiable audible signals associated with each graphic element within the computer display. By generating a composite signal or by cyclicly generating a composite signal, having elements of each identifiable audible signal associated with a graphic element having picture elements within a rotatable sector of the area of interest, a blind or visually impaired user may rapidly and efficiently locate selected objects within window client area 28.

While the invention has been particularly shown and described with reference to a preferred embodiment, it will be understood by those skilled in the art that various changes in form and detail may be made therein without departing from the spirit and scope of the invention.

I claim:

1. A method for enabling a blind or visually impaired user to locate selected graphic elements comprising a plurality of picture elements within a computer display utilizing a movable cursor element, said method comprising the steps of:

associating an identifiable audible signal with each graphic element within said computer display;

periodically detecting a position of said movable cursor element; and generating a composite audible signal which includes elements of each identifiable audible signal associated with each graphic element having picture elements thereof within a rotatable sector of a circle having its origin at said movable cursor and a radius equal to said predetermined radius.

2. The method for enabling a blind or visually impaired user to locate selected graphic elements within a computer display utilizing a movable cursor element according to claim 1, wherein each element of said composite audible signal varies in intensity in inverse proportion to the distance between an associated graphic element and said position of said movable cursor element, within said predetermined radius.

3. The method for enabling a blind or visually impaired user to locate selected graphic elements within a computer display utilizing a movable position of said cursor element according to claim 1, wherein each element of said composite audible signal varies in intensity in direct proportion to the number of picture elements of an associated graphic element within said predetermined radius from said movable cursor element.

4. The method for enabling a blind or visually impaired user to locate selected graphic elements within a computer display utilizing a movable position of said cursor element according to claim 1, wherein said rotatable sector comprises a rotatable quadrant of a circle having its origin at said movable cursor element and a radius equal to said predetermined radius.

5. A system for enabling a blind or visually impaired user to locate selected graphic elements comprising a plurality of picture elements within a computer display utilizing a movable cursor element, said system comprising:

means for associating an identifiable audible signal with each graphic element within said computer display;

means for periodically detecting a position of said movable cursor element; and means for generating a composite audible signal which includes elements of each identifiable audible signal associated with each graphic element having picture elements thereof within a rotatable sector of a circle having its origin at said movable cursor and a radius equal to said predetermined radius.

6. The system for enabling a blind or visually impaired user to locate selected graphic elements within a computer display utilizing a movable position of said cursor element according to claim 5, further including means for varying in intensity each element of said composite audible signal in inverse proportion to the distance between an associated graphic element and said movable cursor element, within said predetermined radius.

\* \* \* \* \*